US006672678B1

(12) United States Patent
Nunes

(10) Patent No.: US 6,672,678 B1
(45) Date of Patent: *Jan. 6, 2004

(54) VEHICLE WHEEL COVER

(76) Inventor: Mitchell M. Nunes, 334 Cindy La., Brandon, FL (US) 33510

( * ) Notice: Subject to any disclaimer, the term of this patent is extended or adjusted under 35 U.S.C. 154(b) by 16 days.

This patent is subject to a terminal disclaimer.

(21) Appl. No.: 10/123,289

(22) Filed: Apr. 16, 2002

Related U.S. Application Data

(63) Continuation of application No. 09/874,020, filed on Jun. 6, 2001, now Pat. No. 6,409,277.

(51) Int. Cl.7 .................................................. B60B 7/06
(52) U.S. Cl. ................................ 301/37.34; 301/37.101
(58) Field of Search .......................... 301/37.101, 37.31, 301/37.34, 37.35, 37.36, 37.102, 37.42

(56) References Cited

U.S. PATENT DOCUMENTS

| | | | | |
|---|---|---|---|---|
| 3,036,867 A | * | 5/1962 | Lyon |
| 3,549,204 A | * | 12/1970 | Spisak |
| 3,726,566 A | * | 4/1973 | Beith |
| 3,746,397 A | * | 7/1973 | Buerger |
| 3,868,147 A | * | 2/1975 | Beisch |
| 4,606,582 A | * | 8/1986 | Warren |
| 4,881,783 A | * | 11/1989 | Campbell |
| 5,031,965 A | * | 7/1991 | Buerger |
| 5,150,949 A | * | 9/1992 | Wang |
| 5,340,201 A | * | 8/1994 | Weirs |
| 5,366,278 A | * | 11/1994 | Brumfield |
| 5,368,370 A | * | 11/1994 | Beam |
| 5,457,886 A | * | 10/1995 | Fuller |
| 5,577,809 A | * | 11/1996 | Chase |
| 5,636,906 A | * | 6/1997 | Chase |
| 5,639,146 A | * | 6/1997 | Chiu |
| 5,795,035 A | * | 8/1998 | Fuller |
| 5,803,552 A | * | 9/1998 | Kato et al. |
| 6,010,196 A | * | 1/2000 | Wang et al. |
| 6,247,760 B1 | * | 6/2001 | Kinoshita |

* cited by examiner

Primary Examiner—Russell D. Stormer
(74) Attorney, Agent, or Firm—Albert O. Cota

(57) ABSTRACT

A vehicle wheel cover (10) having a design (36) which replicates the intrinsic design (20) of a vehicle wheel (12), and which includes a central aperture (38) which encompasses a set of lug nuts located on the vehicle wheel (12). The wheel cover (10) also includes a plurality of spaced wheel cover fasteners (44). When the wheel cover (10) is pressed against the vehicle wheel (12) the wheel cover fasteners (44) clip onto a peripheral edge (14) on the vehicle wheel (12) to securely hold the wheel cover (10) to the vehicle wheel (12). When the wheel cover (10) is attached, the vehicle wheel simulates the appearance of a solid, chrome plated vehicle wheel.

1 Claim, 3 Drawing Sheets

VEHICLE WHEEL COVER

This application is a continuation Application of U.S. application Ser. No. 09/874,020, now U.S. Pat. No. 6,409,277, filed Jun. 6, 2001.

TECHNICAL FIELD

The invention pertains to the general field of vehicle wheels and more particularly to an ornamental vehicle wheel cover that when attached to a vehicle wheel it simulate the appearance of a chrome-plated vehicle wheel.

BACKGROUND ART

Automobiles have become the primary means of transportation for many people in this day and age. In addition to providing transportation, automobiles have also become a visible symbol of what type of person someone is. Some wealthy people perceive expensive automobiles as a status symbol, while a rugged individualist will often drive a sport-utility type vehicle. Other people like to express themselves by painting their automobiles bold colors, or by decorating their automobiles with a variety of custom, personalized items.

As a result of the high number of people who customize their automobiles, a large market has been created which caters exclusively to after-market automobile products. With new technology in metal production, one of the most popular items used to customize or up-grade an automobile is the alloy or "mag" wheel.

The appearance of an automobile with these types of wheels, when compared to an automobile with standard wheels, or even hubcaps, is substantially noticeable. For people who want the ultimate in high-quality and luxury, chrome-plated versions of standard alloy wheels are the wheels of choice, Many luxury cars come either with chrome-plated wheels standard, or as an option. Unfortunately, for people who do not own a luxury car, the only way to have chrome-plated wheels is to purchase them from an aftermarket company. Regardless of how a person may acquire chrome-plated wheels they can often be very expensive. Also, unless special lug nuts with a locking mechanism are installed, chrome-plated wheels are frequently stolen. This risk factor alone is often enough of a detriment to cause many people to choose not to purchase chrome-plated wheels.

The present invention provides a plastic, chrome-plated wheel cover that is easily attached to a non-plated vehicle wheel. The wheel cover is not expensive and that does not present a significant investment.

A search of the prior art did not disclose any patents that read directly on the claims of the instant invention however, the following U.S. patents are considered related:

| U.S. Pat. No. | INVENTOR | ISSUED |
| --- | --- | --- |
| 5,639,146 | Chiu | Jun. 17, 1997 |
| 5,577,809 | Chase | Nov. 26, 1986 |
| 3,726,566 | Beith | Apr. 10, 1973 |

The U.S. Pat. No. 5,639,146 discloses a wheel cover mounting structure which includes a wheel cover having a plurality of locating blocks spaced at an inner side around the periphery, and a plurality of clamps fastened to the locating blocks to secure the wheel cover to the wheel. Each of the locating blocks defines with the wheel cover a receiving chamber and has two retaining slots at two opposite sides of the receiving chamber. Each of the clamps has an upwardly-curved front end inserted through the receiving chamber of one locating block and hooked on the periphery of the wheel, and two retaining rods respectively inserted into the retaining slots of the respective locating block and secured thereto.

The U.S. Pat. No. 5,577,809 discloses a composite vehicle wheel having a disk, a rim circumscribing the disk, and an ornamental metal-plated plastic overlay attached to the outboard surface of the disk. An interior surface mates with at least a portion of the outboard surface of the wheel while an exterior surface has a metal layer plated thereon. The overlay is formed from a relatively thin plastic panel such that the exterior surface uniformly and closely conforms to the outboard surface of the wheel, and the metal layer is substantially flush with the adjacent portions of the outboard surface to provide a pleasing aesthetic effect to the wheel.

The U.S. Pat. No. 3,726,566 discloses a wheel cover mounted to cover the front surface of a wheel. The cover has a concavely contoured front surface and is provided with a central hub opening and circularly spaced lug bolt apertures. Lips are provided about the outer periphery, central hub opening and lug apertures of the wheel cover to grip respectively about the periphery of the tire mounting rim, edge of the hub opening and edges of the lug apertures of the wheel. Adhesive is sandwiched between the wheel and wheel cover which, together with the gripping lips of the wheel cover, permanently and rigidly fix the wheel cover to the wheel.

For background purposes and as indicative of the art to which the invention relates, reference may be made to the following remaining patents found in the search:

| U.S. Pat. No. | INVENTOR | ISSUED |
| --- | --- | --- |
| 5,368,370 | Beam | Nov. 29, 1994 |
| 5,366,278 | Brumfield | Nov. 22, 1994 |
| 3,868,147 | Beisch | Feb. 25, 1975 |
| 3,036,867 | Lyon | May 29, 1962 |

DISCLOSURE OF THE INVENTION

The vehicle wheel cover is adapted to be attached to a standard, factory vehicle wheel constructed of common grade material such as steel. The vehicle wheel includes an intrinsic design and has a plurality of centrally located spaced lug nuts.

The inventive wheel cover is molded of plastic to produce a thin-walled replica of the vehicle wheel which includes the wheel's intrinsic design and a central aperture which accommodates the spaced lug nuts. The wheel cover is applied an enhanced finish, such as a chrome plating and includes on its rear surface a spaced attachment means for attachment to the vehicle wheel. The attachment means preferably consists of a set of wheel cover fasteners, wherein each fastener consists of a wheel clip retainer integrally molded to the peripheral edge on the wheel cover, and a wheel clip that is inserted into and retained within the clip retainer. The wheel clip is dimensioned to be securely clipped to the peripheral edge on the vehicle wheel.

When the wheel cover is attached, the vehicle wheel simulates the appearance of a solid, chrome-plated vehicle wheel.

In view of the above disclosure, it is the primary object of the invention to produce a set of chrome-plated wheel covers that when attached to a standard vehicle wheel, they simulate the appearance of expensive chrome-plated vehicle wheels.

In addition to the primary object of the invention it is also an object of the invention to produce a simulated chrome plated wheel cover that:

- can be made to accommodate various intrinsic designs of standard vehicle wheels,
- provides an improved clip structure that features a combination wheel clip retainer and wheel clip that firmly attaches the wheel cover to the vehicle wheel,
- when attached, the perceived value of the vehicle increases, and
- is cost effective from both manufacturers and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
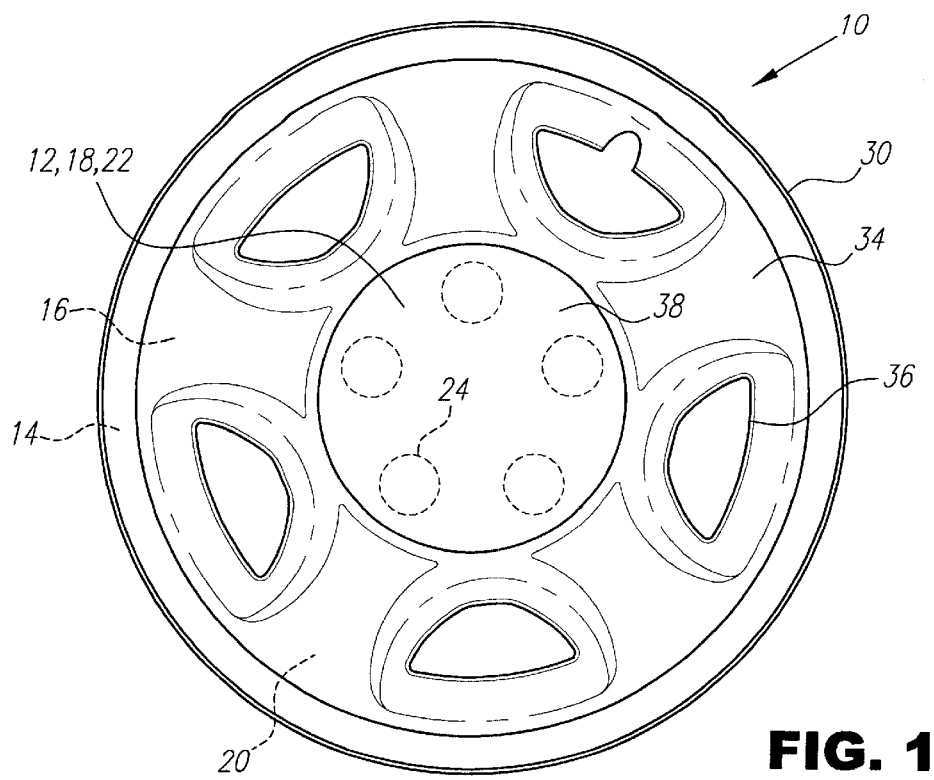
FIG. 1 is a front elevational view of an enhanced finish wheel cover that simulates the intrinsic design of a vehicle wheel and that includes a central aperture which accommodates the lug nuts on the vehicle wheel.

The best mode for carrying out the invention is presented in terms of a preferred embodiment for an enhanced finish vehicle wheel cover 10. The wheel cover 10, as shown in FIGS. 1–9, is adapted to be attached to a standard vehicle wheel 12.

The vehicle wheel 12 which can have a diameter ranging from 12-inches (30.5 cm) to 24-inches (61 cm), is constructed of a common grade material such as steel. The wheel 12 has a peripheral edge 14, an interior surface 16 and an exterior surface 18. The exterior surface 18 has an intrinsic design 20 and includes a central area 22 having a plurality of spaced lug nuts 24.

Figure 2:
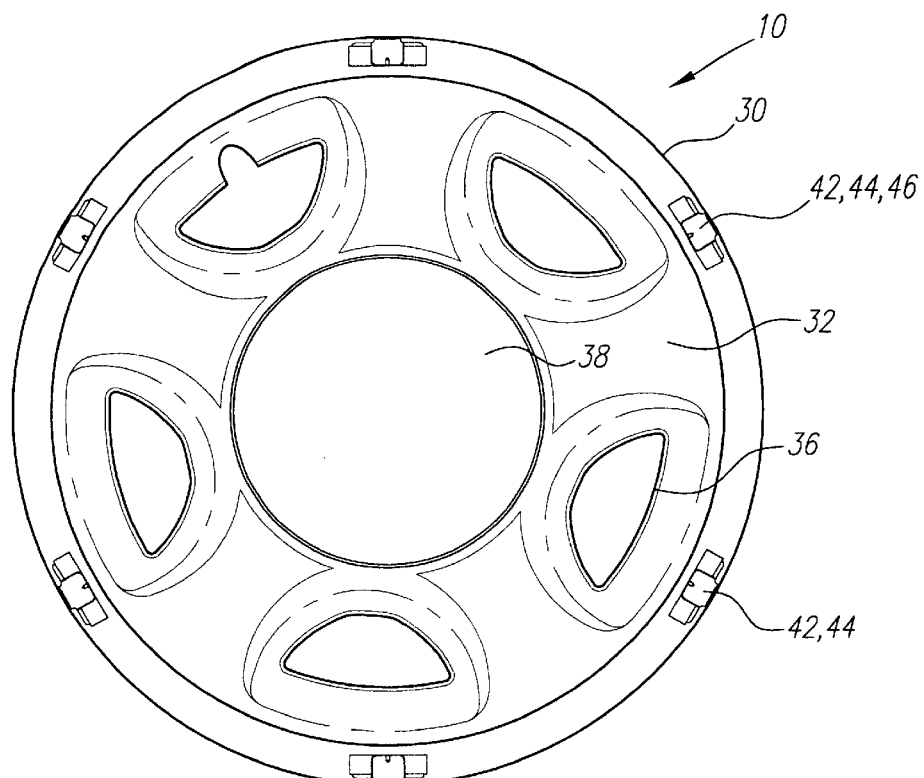
FIG. 2 is a rear elevational view of the wheel cover showing the location of five wheel cover fasteners positioned around and adjacent the peripheral edge of the wheel covers.

The vehicle wheel cover 10 is shown in a front elevational view in FIG. 1 and a rear elevational view in FIG. 2. The cover 10 is molded of a plastic, such as PVC, that is subsequently applied an enhanced finish which typically comprises chrome plating. Additionally, the cover 10 has a peripheral edge 30, an interior surface 32 and an exterior surface 34. The exterior surface 34 has a design 36 which simulates the intrinsic design 20 of the vehicle wheel 12. The design 36 includes a central aperture 38, as shown in FIGS. 1 and 2, which is dimensioned to accommodate the spaced lug nuts 24 located on the vehicle wheel 12.

Around the interior surface 32 and adjacent the wheel's peripheral edge 30 is located a spaced attachment means 42, which preferably consists of a plurality of spaced wheel cover fasteners 44 which can number from three to ten, with five evenly spaced fasteners 44 preferred. Each fastener 44 consists of a wheel clip retainer 46 and a wheel clip 76. The wheel clip retainer 46 is located around and near the peripheral edge 30 of the wheel cover 10. The wheel clip 76 is inserted into and retained within the wheel clip retainer 46.

When the wheel cover 10 is attached to the vehicle wheel 12, the vehicle wheel 12 simulates the appearance of a solid, chrome-plated vehicle wheel.

Figure 3:
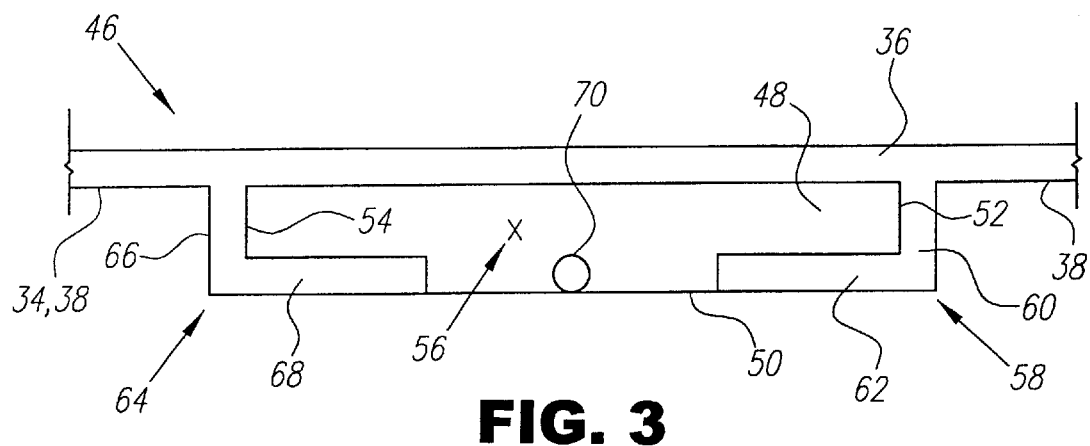
FIG. 3 is an elevational front view of a wheel clip retainer showing the partial wheel clip cavity created by the rear vertical section, the first L-structure and the second L-structure.
Figure 4:
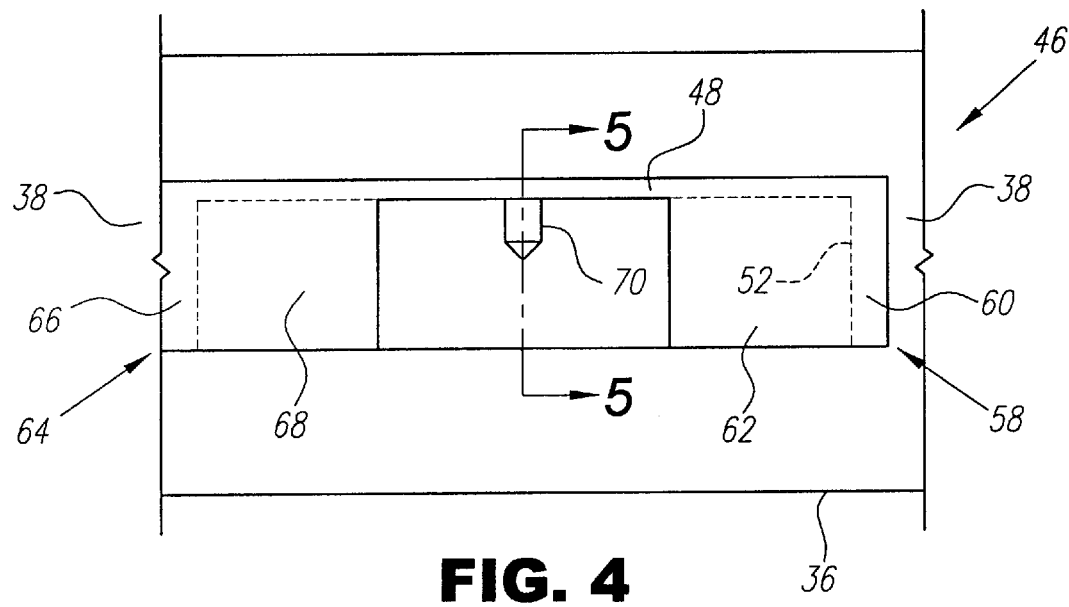
FIG. 4 a plan view of a wheel clip retainer.
Figure 5:
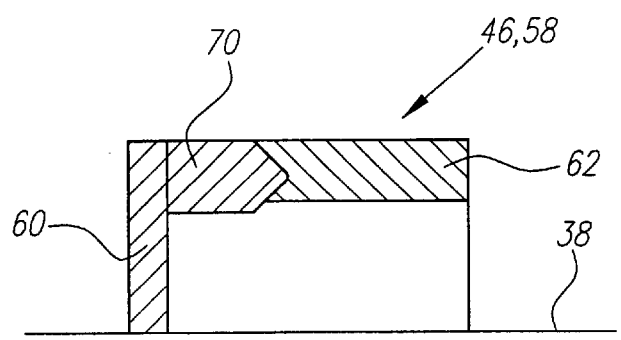
FIG. 5 is a side sectional view of the wheel clip retainer taken along the lines 5—5 of FIG. 4.
Figure 6:
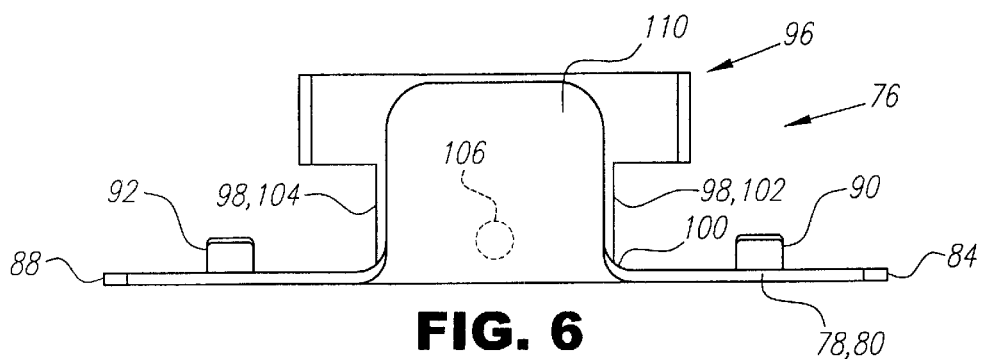
FIG. 6 is a front elevational view of the wheel clip.
Figure 7:
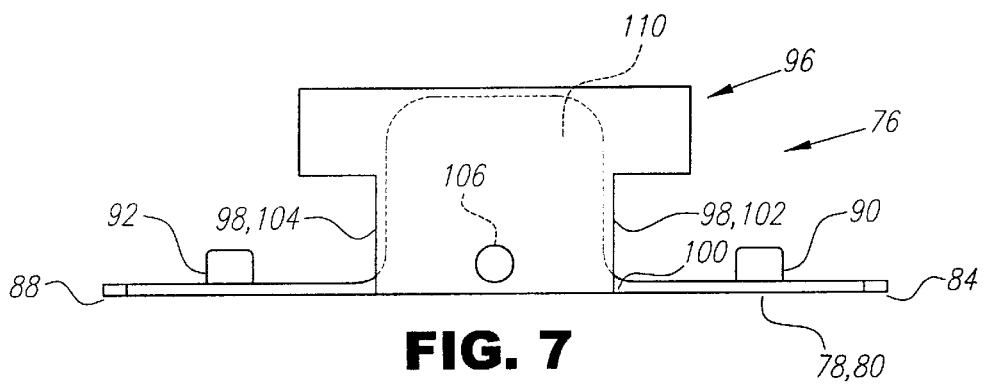
FIG. 7 is a rear elevational view of the wheel clip.

The wheel clip retainer 46, as shown in FIGS. 3, 4 and 5 is preferably an integrally molded element of the wheel cover 10 and forms a partial wheel clip cavity 56 which is dimensioned to receive the wheel clip 76, as described infra. The retainer 44 consists of a rear vertical section 48, a first L-structure 58, a second L-structure 64 and a retaining pin 70.

The rear vertical section 48, as best shown in FIG. 3, extends downward from the peripheral edge 30 on the wheel cover 10. The rear vertical section 48 includes a lower edge 50, a first side edge 52 and a second side edge 54.

The first L-structure 58, as shown in FIGS. 3, 4 and 5, includes a vertical section 60 and a horizontal section 62. The vertical section 60, as best shown in FIG. 4, extends downward from the peripheral edge 30 and is further located adjacent the first side edge 52 of the rear vertical section 48. The horizontal section 62 has a similar width as the vertical section 60. The section 62 extends inward from the vertical section 60 and across the lower edge 50 of the rear vertical section 48 for a distance near one-third the distance of the rear vertical section 48 as shown in FIGS. 3 and 4.

The second L-structure 64, which is also shown in FIGS. 3, 4 and 5 includes a vertical section 66 that extends downward from the peripheral edge 30 and is adjacent to the second side edge 54 of the rear vertical section 48 as shown best in FIG. 4. The horizontal section 68 has a similar width as the vertical section 66 and extends inward from the vertical section 66 and across the lower edge 50 of the rear vertical section 48 for a distance near one-third the distance of the rear vertical section 48 as shown in FIGS. 3 and 4.

The retaining pin 70, as shown best in FIGS. 3 and 4, extends outward from the center of the rear vertical section 48 and terminates near the center of the first and second L-structures 58,60 as shown in FIG. 4.

The second element of the wheel cover fastener 44 is the wheel clip 76. The wheel clip 76, as shown in FIGS. 6–9, is made of a stamped metal such as plated steel and is dimensioned to fit into the partial wheel clip cavity 56 and be attached thereto. The clip 76 consists of a horizontal section 78, an inner wheel edge clip 96 and an outer wheel edge clip 110.

Figure 8:
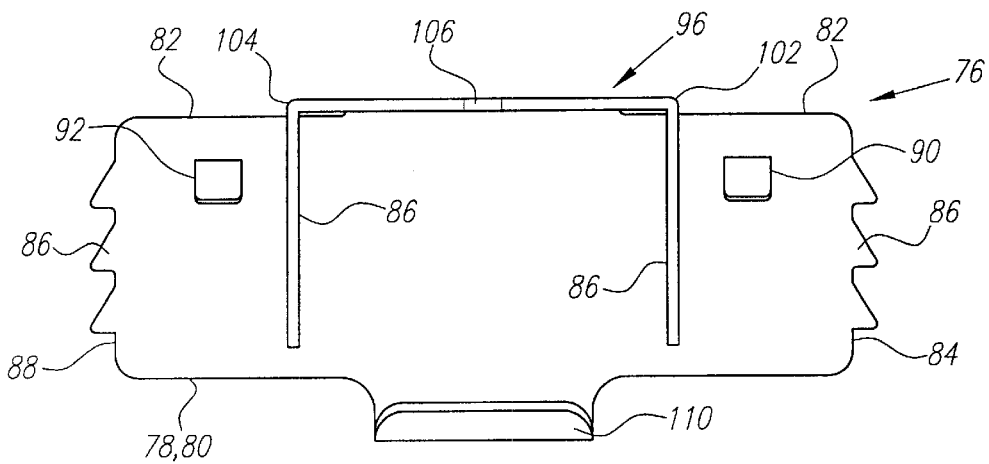
FIG. 8 is a top plan view of the wheel clip.
Figure 9:
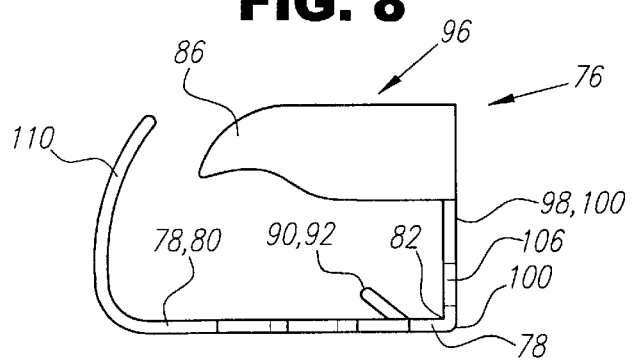
FIG. 9 is a side elevational view of the wheel clip.

The horizontal section 78 has a front edge 80, a rear edge 82, a first side 84 and a second side 88. As shown in FIG. 8, the first side 84 includes a plurality of forward-facing barbs 86 and the second side 88 also includes a plurality of outward-facing barbs 86. Near the rear edge 82 and near the first side 84 is an upward and outward facing first tab 90, and an upward and outward facing second tab 92 is located near the rear edge 82 and near the second side 88. The combination of the forward facing barbs 86 and the upward extending first and second tabs 90,92 securely lock the wheel clip 76 to the partial clip cavity 56 located on the wheel clip retainer 46.

The inner wheel edge clip 96 has a vertical section 98 that extends upward from the center of the rear edge 82 of the horizontal section 78. The vertical section 98 has a lower edge 100, a first side 102, a second side 104 and a bore 106 that is aligned and dimensioned to receive the retaining pin 70 on the wheel clip retainer 46. From the first side 102 of the vertical section 98 extends outward a forward-facing barb 86, and from the second side 104 of the vertical section 98 also extends outward a forward-facing barb 86.

The outer wheel edge clip 110 curves upward and inward from the center front edge 80 of the horizontal section 78. When the wheel cover 10 is pressed into the peripheral edge 14 of the vehicle wheel 12, the combination of the outward facing barbs 86 on the inner wheel edge clip 96 and the outer wheel edge clip 110 lock onto the peripheral edge 14 of the vehicle wheel 12 causing the wheel cover 10 to become securely locked to the vehicle wheel 12.

The wheel cover 10 is manufactured by utilizing a process which produces an enhanced finish, such as chrome plating, wheel cover that when attached to a vehicle wheel 12, it simulates a solid, chrome-plated vehicle wheel 12. The manufacturing process consists of the following steps:

a) Select a vehicle wheel constructed of common grade material, having a peripheral edge, spaced lug nuts and an intrinsic design, b) Produce a replica of the exterior surface of the vehicle wheel, wherein the replica can be made of wood or a resin compound, c) Place the replica against the exterior surface of the vehicle wheel and make any modifications and adjustments to assure a close interface with the vehicle wheel, d) Produce a mold patterned after the modified and adjusted vehicle wheel replica. The mold preferably consists of an injection mold.

e) Produce from the mold a thin-walled plastic vehicle wheel cover having an exterior surface, an interior surface and a peripheral edge, wherein the exterior surface replicates the intrinsic design of the vehicle wheel, f) Apply an enhanced finish to the plastic wheel cover wherein the selected finish is preferably chrome plating.

g) Inspect the chrome plated wheel cover for general appearance, fit, valve stem clearance and the quality of the chrome plating.

h) Attach a plurality of vehicle wheel attachment means spaced around the interior surface and adjacent the peripheral edge of the vehicle wheel cover. The preferred attachment means is comprised of a plurality of retention clips, and i) Attach a set of wheel covers to a set of vehicle wheels by pressing the retention clips against the peripheral edge of the vehicle wheels wherein when attached, the vehicle wheels simulate the appearance of solid, chrome-plated vehicle wheels.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

What is claimed is:

1. A process for enhancing the appearance of vehicle wheels without incurring a large expense, said process comprising the following steps:

a) select a vehicle wheel constructed of common grade material, having an intrinsic design and spaced lug nuts, b) produce a plastic thin-walled wheel cover which replicates the intrinsic design of said vehicle wheel, said wheel cover having an interior surface, an exterior surface, a peripheral edge and a central aperture dimensioned to accommodate the spaced lug nuts, c) attach a plurality of wheel cover fasteners, to the interior surface and adjacent the peripheral edge of said wheel cover, wherein each said wheel cover fastener is comprised of a wheel clip retainer and a wheel clip, wherein the wheel clip retainer is located around the peripheral edge of said wheel cover and the wheel clip is inserted into and retained within the wheel clip retainer.

d) apply a chrome finish to at least the exterior surface of said wheel cover, and e) attach said wheel cover to said vehicle wheel by means of said plurality of wheel cover fasteners, wherein when said wheel cover is attached, said vehicle wheel simulates the appearance of a solid, chrome plated vehicle wheel.

* * * * *